US011891285B2

(12) United States Patent
Fife et al.

(10) Patent No.: US 11,891,285 B2
(45) Date of Patent: Feb. 6, 2024

(54) RAMP

(71) Applicant: ETN Capital, LLC, Sanford, NC (US)

(72) Inventors: Taylor Fife, Sanford, NC (US); Christopher S. Murray, Richmond, VA (US); Ryan Beaver, Richmond, VA (US)

(73) Assignee: ETN Capital, LLC, Sanford, NC (US)

( * ) Notice: Subject to any disclaimer, the term of this patent is extended or adjusted under 35 U.S.C. 154(b) by 185 days.

(21) Appl. No.: 17/493,059

(22) Filed: Oct. 4, 2021

(65) Prior Publication Data

US 2023/0104587 A1 Apr. 6, 2023

(51) Int. Cl.
*B66F 7/24* (2006.01)

(52) U.S. Cl.
CPC .................................... *B66F 7/243* (2013.01)

(58) Field of Classification Search
CPC .................................. B66F 7/243; B60T 3/00
See application file for complete search history.

(56) References Cited

U.S. PATENT DOCUMENTS 4,050,403 A * 9/1977 Miller ..................... B66F 7/243 116/67 R
4,165,862 A * 8/1979 Bennett ................... B66F 7/243 254/88
4,427,179 A * 1/1984 Price ....................... B66F 7/243 33/391
4,819,910 A * 4/1989 Johnston ................. B66F 7/243 254/88
6,439,543 B1 * 8/2002 Peckham ................ B66F 7/243 33/391
6,517,051 B1 * 2/2003 Cavanaugh ............. B66F 7/243 254/88
6,752,381 B2 6/2004 Colak et al.
7,040,461 B2 * 5/2006 Chrisco ..................... B60T 3/00 D12/217
7,073,777 B2 * 7/2006 Branstetter ............. B66F 7/243 254/1
7,980,532 B2 7/2011 Wickwire
8,739,941 B2 6/2014 White et al.
8,935,822 B2 1/2015 Frederiksen
10,081,948 B2 * 9/2018 Gilsing ................. E04F 11/002
D855,005 S * 7/2019 Delancey ..................... D12/217
2010/0252788 A1 10/2010 Wickwire

* cited by examiner

*Primary Examiner* — Seahee Hong
(74) *Attorney, Agent, or Firm* — COATS & BENNETT, PLLC

(57) ABSTRACT

A ramp configured to support a wheel of a vehicle. The ramp includes a tapered height and a curved surface for a wheel of a vehicle to move along and elevate above a support surface. The ramp includes a base block configured to contact against the support surface. One or more stacker blocks are configured to connect to the base block to increase the elevation of the wheel of the vehicle. The base block and one or more stacker blocks are configured to be removably connected together to be adjustable to the needs of the user.

17 Claims, 6 Drawing Sheets

RAMP

TECHNICAL FIELD

The present application relates generally to a ramp and, more specifically, to a ramp with a curved top side and that is constructed from two or more overlapping components.

BACKGROUND

Ramps are used for a wide variety of purposes, including but not limited to elevating a vehicle. In one specific example, a ramp is used to elevate one side of a vehicle to level the vehicle while it is parked on a hill or other non-flat surface. In one specific example, the ramp is used to level a recreational vehicle such as a camper. In another specific example, the ramp is used to level a commercial vehicle, such as a medical vehicle that is providing medical services to persons.

The ramps include a length measured between a leading edge and a trailing edge. The ramps further include a different height that increases from the leading edge to the trailing edge. During use, the wheel of the vehicle initially contacts against the leading edge and moves along the length towards the trailing edge. The farther the wheel moves along the length the greater the vehicle is lifted.

Some ramps include a larger length with a gradually increasing height. The longer length provides for a more gradual increase in height that is often easier for the user to locate the wheel at the desired spot to gain the desired elevation for the wheel. A drawback of longer ramps is the inability for their use in many situations in which there is not adequate space for the ramp. A shorter ramp has the advantage that it can be used in more situations. A drawback is the shorter length has an increased steepness in height between the leading and trailing edge. This increased steepness makes it more difficult for the user to locate the wheel at the desired height.

There is a need for a ramp that is configurable to be used in different situations depending upon the needs of the user.

SUMMARY

One aspect is directed to a ramp to elevate a wheel of a vehicle above a support surface. The ramp comprises a base block comprising: a leading edge; a trailing edge; a bottom side that extends between the leading and trailing edges and is configured to contact against the support surface; a top side that extends between the leading and trailing edges and is opposite from the bottom side with the top side comprising a first curved shape that extends between the leading and trailing edges. The ramp comprises a stacker block configured to connect to and be stacked on the base block with the stacker block comprising: a bottom side with a second curved shape; and a top side with a third curved shape. One or more projections extend outward from one of the top side of the base block and the bottom side of the stacker block. One or more openings are in the other of the top side of the base block and the bottom side of the stacker block. The one or more projections are configured to fit into the one or more openings to prevent relative movement between the base block and the stacker block.

In another aspect, the first curved shape of the top side of the base block has a constant radius between the leading edge and the trailing edge of the base block.

In another aspect, the first curved shape matches the second curved shape for the base block and stacker block to seat together when the one or more projections are inserted into the one or more openings.

In another aspect, each of the base block and the stacker block comprise a height measured between the respective bottom side and the top side, with the height increasing from the leading edge to the trailing edge and the height of the base block at the trailing edge is larger than the height of the stacker block at the trailing edge.

In another aspect, the top side of the base block comprises a lattice structure formed by a plurality of ribs with an intersecting pattern that extend within the peripheral wall of the base block.

In another aspect, the one or more openings and the one or more projections comprise complementary polygonal sectional shapes.

In another aspect, the bottom side of the base block comprises a curved shape that extends continuously between the leading and trailing edges.

In another aspect, the stacker block is a first stacker block and further comprising one or more additional stacker blocks each comprising: a bottom side with a fourth curved shape that matches the third curved shape of the first stacker block; a top side with a fifth curved shape; and one or more projections that extend outward from the bottom side and are configured to fit into the one or more openings of the first stacker block.

In another aspect, a length of each of the base block and the stacker block is equal with the lengths measured between the respective leading and trailing edges.

One aspect is directed to a ramp to elevate a wheel of a vehicle above a support surface. The ramp comprises a base block comprising a height that increases from a leading edge to a trailing edge with the base block further comprising a curved top side that extends continuously between the leading edge and the trailing edge, and a bottom side configured to contact against the support surface. The ramp also comprises one or more stacker blocks each configured to stack onto and connect to the top side of the base block with each of the one or more stacker blocks comprising a top side and a bottom side with the bottom side comprising a curved shape that matches the curved top side of the base block.

In another aspect, one or more projections that extend outward from the bottom side of the one or more stacker blocks and one or more openings that extend into the top side of the base block with the one or more projections configured to mate with the one or more openings to stack the one or more stacker blocks in a stacked arrangement with the base block.

In another aspect, the one or more projections completely fit into the one or more openings such that the bottom of one of the stacker blocks contacts against the top side of the base block when mounted together.

In another aspect, the top side of the one or more stacker blocks comprises a curved shape that extends continuously between a leading edge and a trailing edge.

In another aspect, each of the one or more stacker blocks comprises a common shape and size.

In another aspect, the base block comprises a greater height at the trailing edge than each of the one or more stacker blocks.

In another aspect, the base block comprises a lattice structure that is exposed on the top side of the base block.

One aspect is directed to a method of stacking a ramp comprising: positioning a base block on a support surface with a bottom side of the base block contacting against the support surface and a top side having a curved shape facing outward away from the support surface; stacking a stacker block onto the base block with a curved bottom side of the stacker block contacting against the curved top side of the base block and with a top side of the stacker block facing outward away from the support surface; and engaging the stacker block with the base block and preventing the stacker block from moving relative to the base block.

In another aspect, the method further comprises contacting the curved bottom side of the stacker block continuously across an entirety of the top side of the base block.

In another aspect, engaging the stacker block with the base block and preventing the stacker block from moving relative to the base block comprises inserting projections on the bottom side of the stacker block into openings in the top side of the base block.

The features, functions and advantages that have been discussed can be achieved independently in various aspects or may be combined in yet other aspects, further details of which can be seen with reference to the following description and the drawings.

DETAILED DESCRIPTION

The present application is directed to a ramp configured to support a wheel of a vehicle. The ramp includes a tapered height and a curved surface for a wheel of a vehicle to move along and elevate above a support surface. The ramp includes a base block configured to contact against the support surface. One or more stacker blocks are configured to connect to the base block to increase the elevation of the wheel of the vehicle. The base block and one or more stacker blocks are configured to be removably connect together to be adjustable to the needs of the user.

Figure 1:
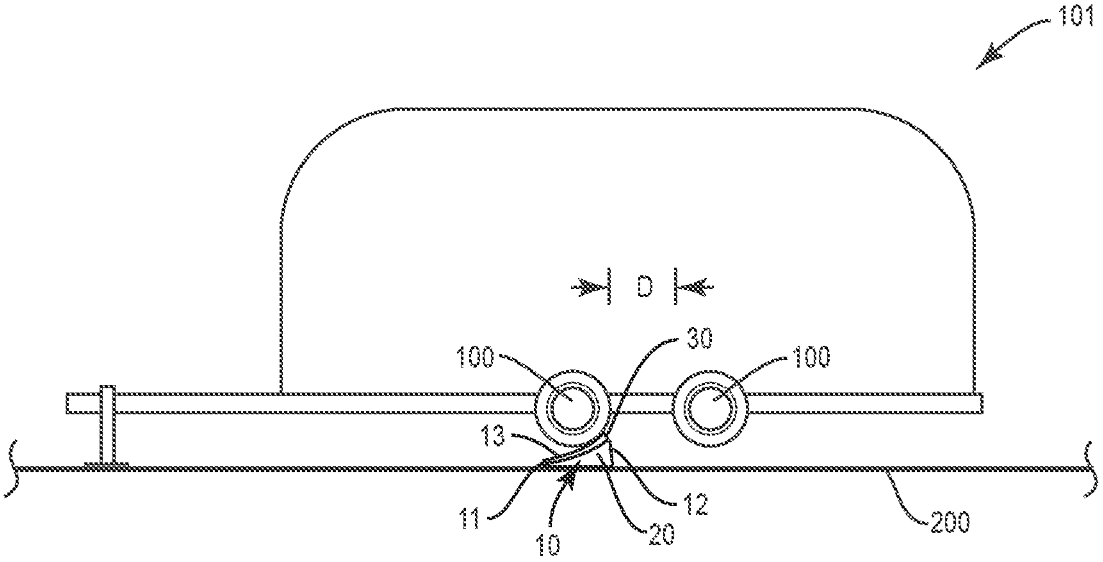
FIG. 1 is a side schematic view of a ramp in use to support a wheel and elevate a vehicle.

FIG. 1 illustrates one example of a ramp 10 used to elevate a wheel 100 of a vehicle 101 above a support surface 200. The ramp 10 includes a tapering height that increases from a leading edge 11 to a trailing edge 12. The top side 13 of the ramp 10 includes a curved shape that increases in steepness towards the trailing edge 12. The ramp 10 is constructed from a base block 20 and a stacker block 30 that are stacked together. The number of stacker blocks 30 mounted on the base block 20 can vary depending upon the desired height to raise the wheel 100 above the support surface 200. In use, a user backs the wheel 100 onto the leading edge 11 of the ramp 10 and then moves the wheel 100 along the length towards the trailing edge 12 to obtain the required elevation.

The ramp 10 can be used for various purposes and on a variety of different vehicles 101. One application is to level the vehicle 101, such as when the vehicle 101 is a camper or other vehicle that requires a level orientation. Another application is a medical vehicle that requires the vehicle 101 to be within a predetermined level orientation. FIG. 1 illustrates the ramp 10 used on a dual-axle vehicle 101. The limited distance D between the two wheels 100 prevents the use of some existing ramps that are either too long or not otherwise configured to fit within the space between the wheels 100. The ramp 100 can also be used to elevates various other types of vehicles 101, such as but not limited to cars, trucks, construction equipment, forklifts, and bicycles.

Figure 2:
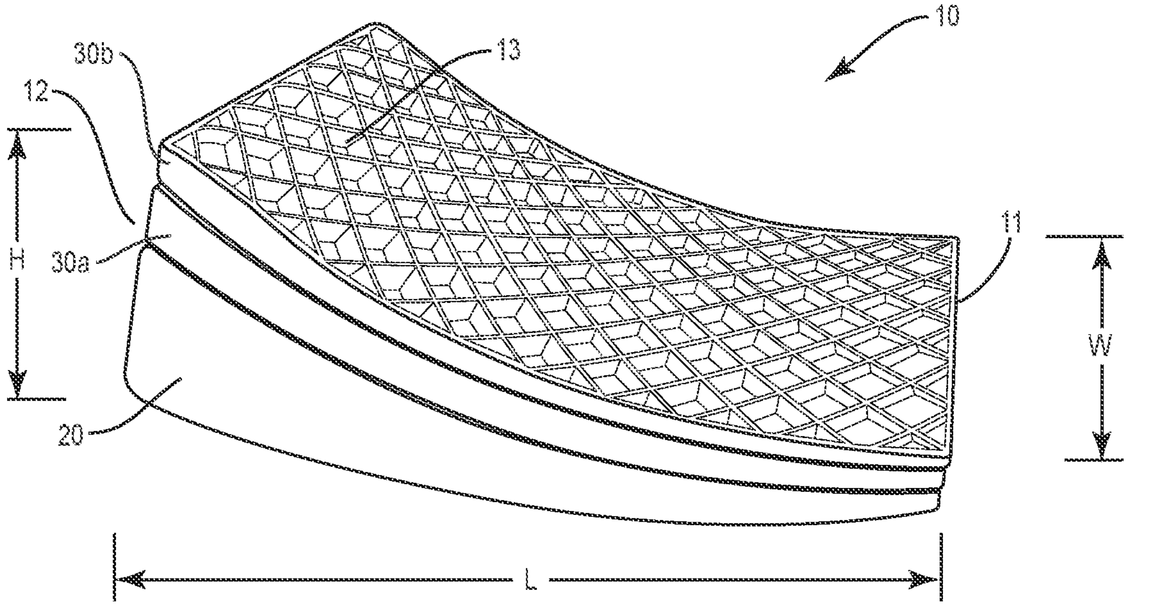
FIG. 2 is a perspective view of a ramp with a base block and two stacker blocks.
Figure 3:
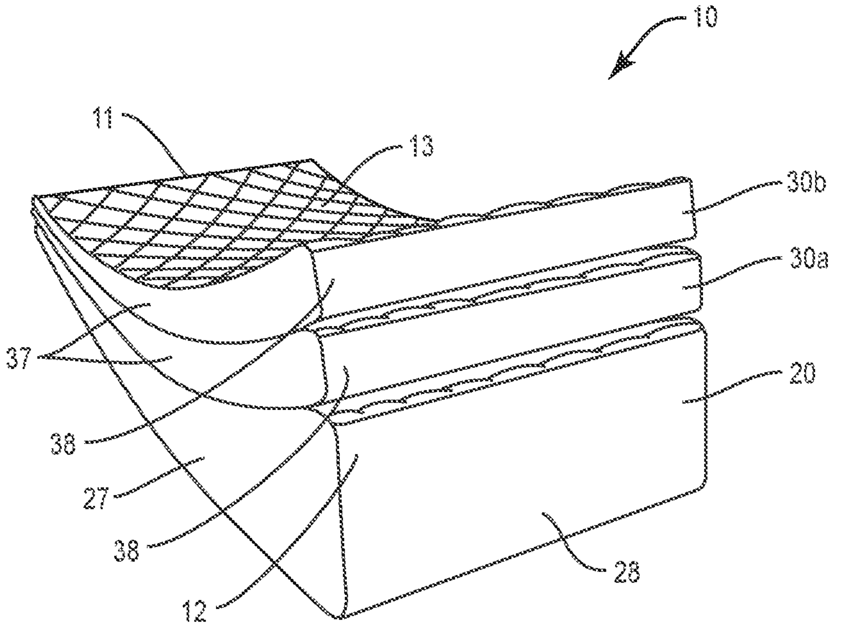
FIG. 3 is a perspective view of a ramp with a base block and two stacker blocks.
Figure 4:
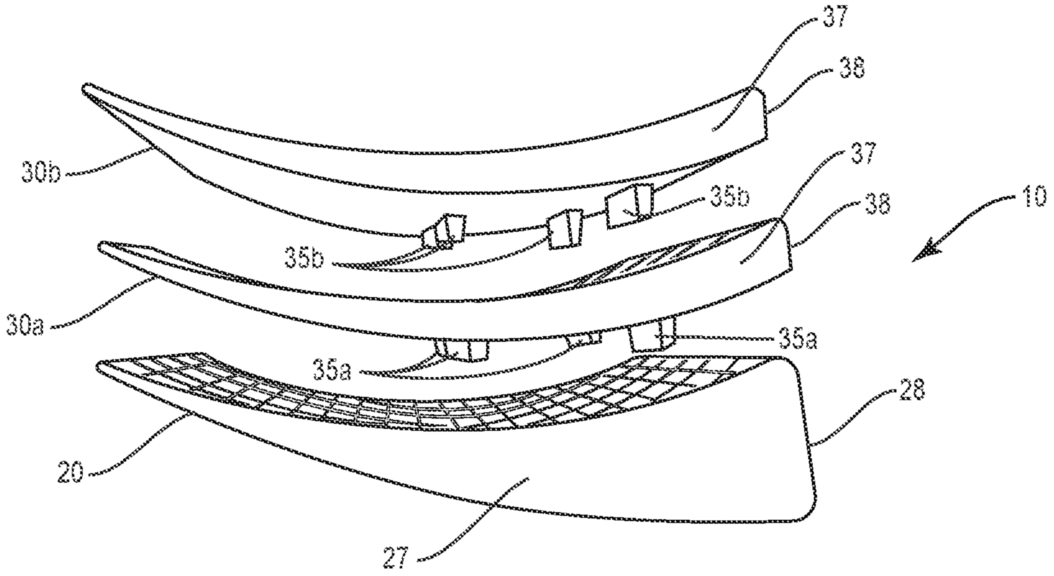
FIG. 4 is an exploded perspective view of a ramp with a base block and two stacker blocks.

FIGS. 2, 3, and 4 illustrate one example of ramp 10. This example includes a base block 20 with two separate stacker blocks 30*a*, 30*b*. Other examples include different numbers of stacker blocks 30, such as a single stacker block 30 connected to the base block 20 and three or more stacker blocks 30 connected to the base block 20.

As illustrated, the ramp 10 includes a leading edge 11 and a trailing edge 12 each with a height H measured between the bottom of the base block 20 and the top of the top stacker block 30*b*. The leading edge 11 has a reduced height to allow a wheel 100 of the vehicle 101 to roll from a support surface 200 onto the ramp 10. The trailing edge 12 includes a greater height configured to elevate the wheel 100 above the support surface 200. The bottom side of the ramp 10 is formed by the bottom side 21 of the base 20 and the top side 13 of the ramp 10 is formed by the top of stacker block 30*b*. The top side 13 has a curved shape that extends between the leading and rear edges 11, 12. The extent of curvature can vary.

In one example, the length L and width W of the base block 20 is equal to the one or more stacker blocks 30. This provides for the base and stacker blocks 20, 30 to be aligned along the leading and rear edges 11, 12, as well as the lateral sides.

Figure 5:
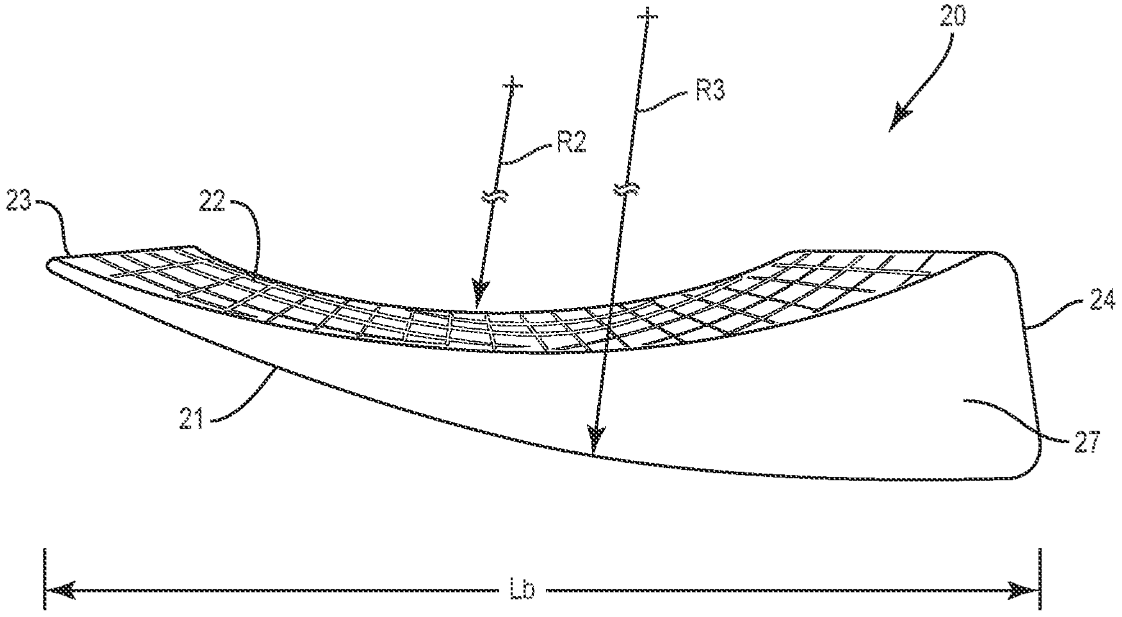
FIG. 5 is a perspective view of a base block.

The base block 20 is configured to contact against the support surface 200 and support the one or more additional stacker blocks 30. As illustrated in FIG. 5, the base block 20 includes a bottom side 21, top side 22, leading edge 23, and a trailing edge 24. The bottom side 21 is configured to contact against the support surface 100. In one example, the bottom side 21 is flat. In another example as illustrated in FIG. 5, the bottom side 21 has a curved shape. In one example, the curved shape is continuous between the leading edge 23 and the trailing edge 24. In one example, the curvature is constant along the length Lb and includes a radius R1. In another example, the curvature of the bottom side 21 varies along the length Lb.

The top side 22 is configured to contact against and connect with a stacker block 30. The top side 22 includes a curved shape that extends the length Lb between the leading and trailing edges 23, 24. In one example, the curved shape is consistent across the length Lb and includes a radius R2. In one example, the radius is constant along the entire length Lb. In another example, the curvature varies across the length L.

In one example, the radius R1 of the bottom side 21 is larger than the radius R2 of the top side 22. In one specific example, the radius R1 of the bottom side 21 is 21.00 inches and the radius of the top side 22 is 14.12 inches. In one example as illustrated in FIG. 5, the centers of the radii R1, R2 are offset along the length Lb. This offset positioning provides for the ramp 10 to function like a cam and pivot during movement of the wheel 100 along the length L. The wheel 100 initially rolls onto the leading edge 11 of the ramp

10 and seat itself on the ramp 10 before the ramp starts to pivot and lift as it gets closer to the rear edge 12. The curved shape of the bottom side 21 results in a limited amount of bottom side 21 contacting against the flat support surface 100 and the base 20 pivoting during use as the wheel 100 moves along the length L of the ramp 10. In the example illustrated in FIG. 5, a middle section of the bottom side 21 contacts against the support surface 100 while a leading section and trailing section are spaced away from the support surface 100.

Figure 6:
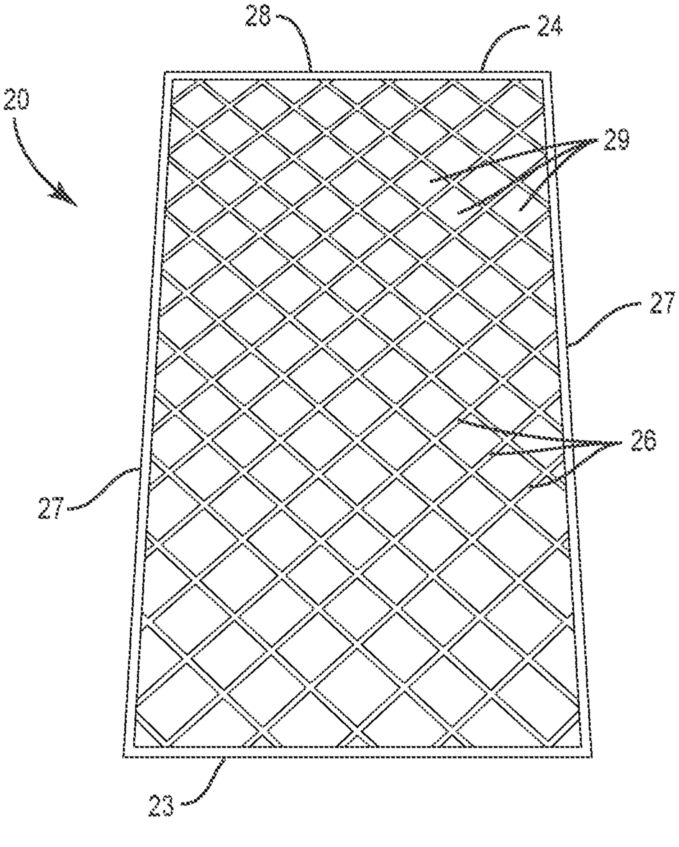
FIG. 6 is a top view of the base block of FIG. 5.

In one example as illustrated in FIG. 6, the base block 20 includes the bottom side 21, lateral walls 27, and a trailing wall 28 that extend around and form an open interior space. Ribs 26 are integrally formed with the bottom side 21, lateral walls 27, and trailing wall 28 and intersect to form a lattice structure within the open interior. In one example as illustrated in FIG. 6, the ribs 26 have a straight shape and extend diagonally across the open interior in opposing directions. The ribs 26 form receptacles 29 throughout the open interior to engage with the stacker block 30. The ribs 26 extend upward from the bottom side 21 and have a height measured from the bottom side 21 that is equal to the height of the lateral walls 27. The height of the ribs 26 and lateral walls 27 increase from the leading edge 23 to the trailing edge 24. The top edges of the ribs 26, lateral walls 27, and trailing wall 28 are aligned and form the top side 22 that supports the wheel 100 of the vehicle 101. In one example, the base 20 is solid with a continuous top side 22. One or more receptacles extend into the top side 22.

Figure 7:
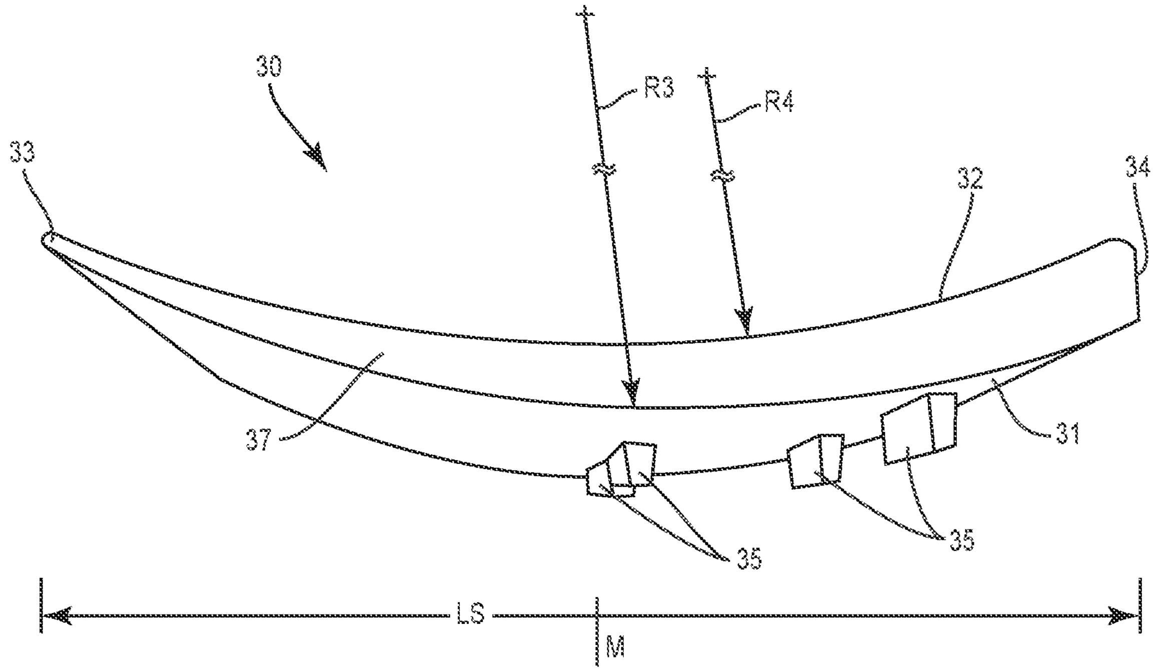
FIG. 7 is a perspective view of a stacker block.

The one or more stacker blocks 30 are configured to connect to the base block 20. The connection prevents the stacker block 30 from moving relative to the base block 20 to maintain the relative positioning of the stacker block 30 and base block 20. The connection also provides for removably connecting the stacker block 30 to the base block 20. One example of the stacker block 30 is illustrated in FIG. 7 and includes a bottom side 31, a top side 32, a leading edge 33, and a trailing edge 34. In one example, the stacker block 30 includes a length Ls and width that is the same as the base block 20 such that the stacker block 30 aligns with the base block 20 without overhanging along any side. In another example, one or both of the length Ls and width of the stacker block 30 are different than the base block 20.

As illustrated in FIG. 7, the stacker block 30 includes a ramped shaped with a tapered height that increases from the leading edge 33 to the trailing edge 34. The bottom side 31 includes a curved shape. In one example, the curved shape matches the curved shape of the top side 22 of the base block 20. This matching provides for the stacker block 30 to seat fully against the base block 20 along the length of the top side 22. In one example, the bottom side 31 includes a curved shape with a radius R3 that extends continuously along the length Ls. In one example, the radius R3 is equal to the radius R2 of the top side 22. In another example, the curvature of the bottom side 31 varies along the length Ls and matches the curvature of the top side 22 of the base block 20.

The top side 32 includes a curved shape. In one example, the curved shape includes a radius R4 that is continuous along the length Ls. In another example, the curvature varies along the length Ls.

Figure 8:
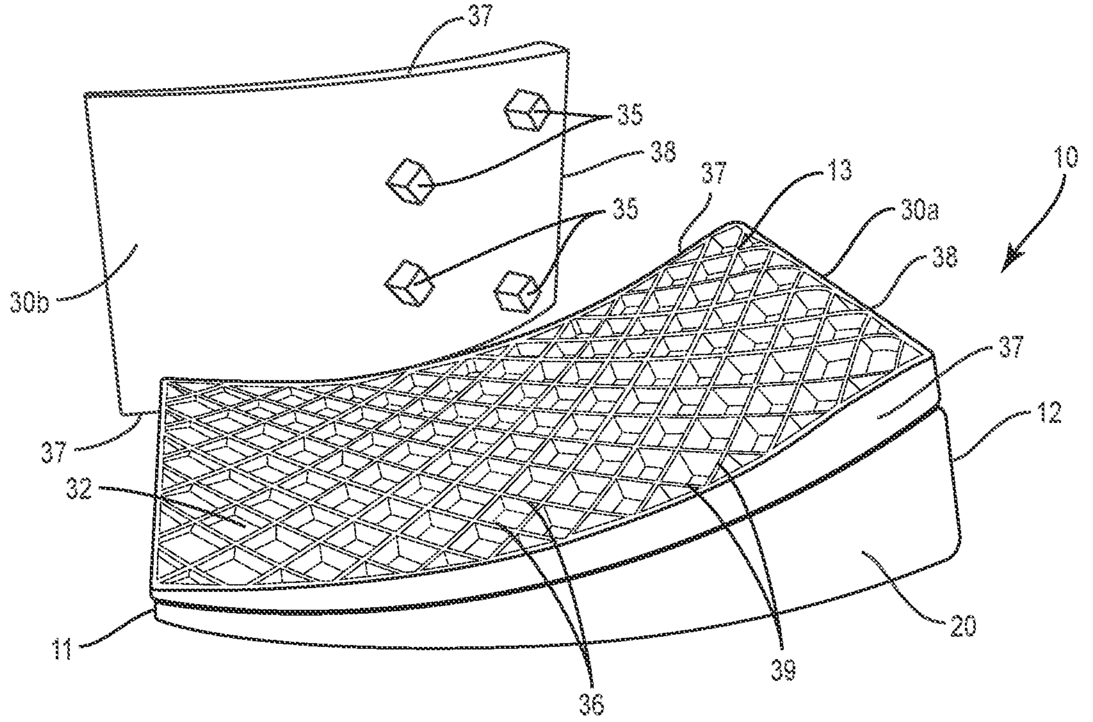
FIG. 8 is a perspective view of a ramp with a base block and a stacker block and with a second stacker block positioned on its side and adjacent to the ramp.

In one example, the stacker block 30 is solid. In another example as illustrated in FIG. 8, the stacker block 30 includes lateral walls 37 and trailing wall 38 that include an open interior space. Ribs 36 extend across the space and form a lattice structure. In one example, the height of the lateral walls 37 increases from the leading edge 33 to the trailing edge 34. One or more receptacles 39 are formed along the top side 32 to receive the corresponding projections 35 of another stacker block 30 that is connected on top.

One or more projections 35 extend outward from the bottom side 31 and are configured to connect to the base block 20 or other stacker block 30. Each of the one or more projections 35 are sized and shaped to be inserted into one of the receptacles 29 in the top side 22. In one example, the projections 35 include a sectional shape and size that matches the sectional shape and size of the receptacles 29. In one example, the projections 35 include a polygonal sectional shape that matches the shape of the receptacles 29. In one example, each of the projections 35 includes the same shape and size. In another example, two or more of the projections 35 include a different shape and/or size. The number of projections 35 can vary. In one example, the stacker block 30 includes a single projection 35. In other examples, the stacker block 30 includes two or more projections 35. In one example, the one or more projections 35 engage with a releasable friction engagement with the one or more receptacles 29.

The projections 35 and receptacles 29 are configured for the projections 35 to fit fully into the receptacles 29. This provides for the stacker block 30 to fully seat onto the base block 20 and for the bottom side 31 of the stacker block 30 to contact against the top side 22 of the base block 20. This provides for the weight applied by the wheel 100 to transfer by the bottom side 31 to the base block 20 rather than for the transfer to occur through the projections 35. This provides for the ramp 10 to function as a one-piece unit to support the vehicle 101.

The ramped shape of the base block 20 results in the depth of the receptacles 29 measured between the top side 22 and the bottom side 21 to increase towards the trailing edge 24 (i.e., the receptacles 29 towards the trailing edge 24 are deeper than the receptacles 29 towards the leading edge 23). To ensure fully insertion of the projections 35 into the receptacles 29, in one example the one or more projections 35 are positioned along a rear section of the stacker block 30 in closer proximity to the trailing edge 34 than to the leading edge 33. In one example as illustrated in FIG. 7, the one or more projections 35 are positioned along a trailing half of the length Ls between a midpoint M and the trailing edge 34.

The ramp 10 can include one or more stacker blocks 30 stacked onto the base block 20. FIG. 2 includes an example of a ramp 10 with a pair of stacker blocks 30 connected to the base block 20. FIG. 8 includes a ramp 10 with a single stacker block 30 connected to the base block 20.

In one example, each of the stacker blocks 30 includes the same shape and size. In another example, the different stacker blocks 30 include different shapes and/or sizes. In one example of a ramp 10 having multiple stacker blocks 30, the top side 32 of an underneath stacker block 30 has a curved shape that matches the curved shape of a bottom side 31 of a covering stacker block 30. This matching configuration provides for the one or more projections 35 to insert into the corresponding one or more receptacles 29 for the bottom side 31 to contact against the top side 32 and transfer the weight along these surfaces rather than through the one or more projections 35. In another example, the curved shapes of the mating stacker blocks 30 are different.

Figure 9:
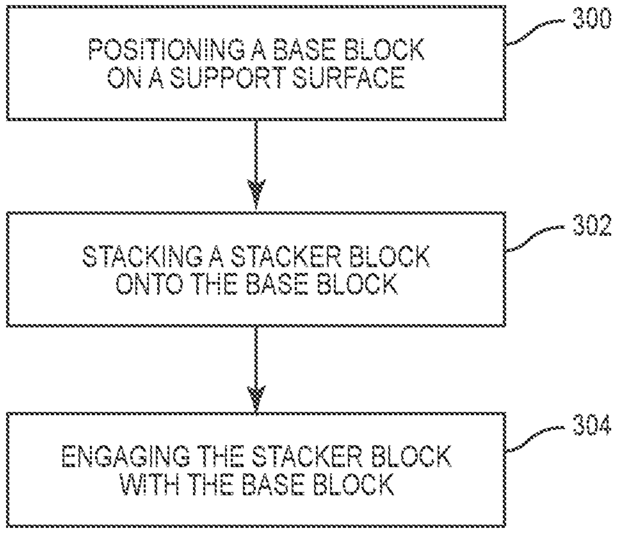
FIG. 9 is a flowchart diagram of a method of stacking a ramp.

FIG. 9 illustrates a method of using the stacked ramp 10. The method includes positioning a base block 20 on a support surface 200 (block 300). The bottom side 21 of the base block 20 contacts against the support surface 200 and the top side 22 that includes a curved shape faces outward away from the support surface 200.

The method includes stacking a stacker block 30 onto the base block 20 (block 302). The curved bottom side 31 of the stacker block 30 contacts against the curved top side 22 of the base block 20. The stacker block 30 is positioned with the top side 32 of the stacker block 30 facing outward away from the support surface 200. The stacker block 30 is engaged with the base block 20 to prevent the stacker block 30 from moving relative to the base block 20 (block 304).

Once the stacker block 30 is stacked onto and engaged with the base block 20, a wheel 100 of a vehicle 101 can be moved onto the ramp 10. The wheel 100 moves along the support surface 200 and onto the ramp 10 at a leading edge 11. The wheel 100 is then moved along the top side 32 of the stacker block 30 to elevate the wheel 100 to the desired height above the support surface 200.

In another example, one or more additional stacker blocks 30 are mounted onto the top of the ramp 10. This includes stacking the next stacker block 30 onto the top side 32 of the stacker block 30 that is engaged with the base 20. This additional stacker block 30 is engaged with the stacker block 30 to form a ramp 10 with three components (i.e., base block 20, first and second stacker blocks 30). The second stacker block 30 engages with the first stacker block 30 with the one or more projections 35 on the second stacker block 30 engaging with the one or more receptacles 39 on the first stacker block 30. Additional stacker blocks 30 can be added to the ramp 10 as necessary to obtain the desired elevation of the top side 13 of the ramp 10 above the support surface 200.

In one example, the base block 20 can be used independently to elevate a wheel 100 of a vehicle 100. The base block 20 is positioned on the support surface 200. The wheel 100 is moved along the support surface 200 to the leading edge 23 of the base block 20. The wheel 100 is then moved along the top side 22 of the base block 20 until the wheel 100 is elevated as necessary.

The ramp 10 can include various shapes and sizes. In one example, the ramp 10 includes a length L of 15.00 inches. In one example, the base block 20 includes a greater height at the trailing edge 24 than the one or more stacker blocks 30.

In one example, the curvature on the top side 22, 32 of each of the base block 20 and one or more stacker blocks 30 of the ramp 10 is the same.

In one example, the curvature of the sides that mate together are the same (i.e., top side 22 of base block 20 and bottom side 31 of stacker block 30, top side 32 of first stacker block 30 and bottom side 31 of second stacker block 30). This provides for the different blocks 20, 30 to stack together and for the blocks to engage along the entire length L of the blocks.

The base block 20 and one or more stacker blocks 30 can be constructed from a variety of different materials. Examples include but are not limited to polypropylene, plastic, and rubber. In one example, each of the base block 20 and one or more stacker blocks 30 are constructed from the same material. In another example, two or more of the base block 20 and one or more stacker blocks 30 are constructed from different materials.

In another example, the base 20 includes one or more projections that extend outward from and are configured to engage with corresponding one or more receptacles in the stacker block 30.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A ramp to elevate a wheel of a vehicle above a support surface, the ramp comprising:

a base block comprising:

a leading edge;

a trailing edge;

a bottom side that extends between the leading and trailing edges and is configured to contact against the support surface;

a top side that extends between the leading and trailing edges and is opposite from the bottom side, the top side comprising a first curved shape that extends between the leading and trailing edges;

a stacker block configured to connect to and be stacked on the base block, the stacker block comprising:

a leading edge;

a trailing edge;

a bottom side with a second curved shape;

a top side with a third curved shape;

one or more projections that extend outward from one of the top side of the base block and the bottom side of the stacker block;

one or more openings in the other of the top side of the base block and the bottom side of the stacker block; and the one or more projections configured to fit into the one or more openings to prevent relative movement between the base block and the stacker block;

wherein a length of each of the base block and the stacker block is equal with the lengths measured between the respective leading and trailing edges.

2. The ramp of claim 1, wherein the first curved shape of the top side of the base block has a constant radius between the leading edge and the trailing edge of the base block.

3. The ramp of claim 1, wherein the first curved shape matches the second curved shape for the base block and stacker block to seat together when the one or more projections are inserted into the one or more openings.

4. The ramp of claim 1, wherein each of the base block and the stacker block comprise a height measured between the respective bottom side and the top side, with the height increasing from the leading edge to the trailing edge and the height of the base block at the trailing edge is larger than the height of the stacker block at the trailing edge.

5. The ramp of claim 1, wherein the top side of the base block comprises a lattice structure formed by a plurality of ribs with an intersecting pattern that extend within a peripheral wall of the base block.

6. The ramp of claim 5, wherein the one or more openings and the one or more projections comprise complementary polygonal sectional shapes.

7. The ramp of claim 1, wherein the bottom side of the base block comprises a curved shape that extends continuously between the leading and trailing edges.

8. The ramp of claim 1, wherein the stacker block is a first stacker block and further comprising one or more additional stacker blocks each comprising:

a bottom side with a fourth curved shape that matches the third curved shape of the first stacker block;

a top side with a fifth curved shape; and one or more projections that extend outward from the bottom side and are configured to engage with the first stacker block.

9. A ramp to elevate a wheel of a vehicle above a support surface, the ramp comprising:

a base block comprising a height that increases from a leading edge to a trailing edge, the base block further comprising a curved top side that extends continuously between the leading edge and the trailing edge, and a bottom side configured to contact against the support surface; and a plurality of stacker blocks each configured to stack onto and connect to the top side of the base block with each of the plurality of stacker blocks comprising a top side and a bottom side with the bottom side comprising a curved shape that matches the curved top side of the base block; wherein each of the plurality of stacker blocks comprises a common shape and size.

10. The ramp of claim 9, further comprising:

one or more projections that extend outward from the bottom side of the plurality of stack blocks;

one or more openings that extend into the top side of the base block; and the one or more projections configured to mate with the one or more openings to stack the one or more stacker blocks in a stacked arrangement with the base block.

11. The ramp of claim 10, wherein the one or more projections completely fit into the one or more openings such that the bottom side of one of the stacker blocks contacts against the top side of the base block when mounted together.

12. The ramp of claim 9, wherein the top side of the plurality of stack blocks comprises a curved shape that extends continuously between a leading edge and a trailing edge.

13. The ramp of claim 9, wherein the base block comprises a greater height at the trailing edge than a height at a trailing edge of each of the plurality of stack blocks.

14. The ramp of claim 9, wherein the base block comprises a lattice structure that is exposed on the top side of the base block.

15. A method of stacking a ramp comprising:

positioning a base block on a support surface with a bottom side of the base block contacting against the support surface and a top side having a curved shape facing outward away from the support surface;

stacking a stacker block onto the base block with a curved bottom side of the stacker block contacting against the curved top side of the base block and with a top side of the stacker block facing outward away from the support surface;

aligning leading edges of the base block and the stacker block and aligning trailing edges of the base block and the stacker block; and engaging the stacker block with the base block and preventing the stacker block from moving relative to the base block.

16. The method of claim 15, further comprising contacting the curved bottom side of the stacker block continuously across an entirety of the top side of the base block.

17. The method of claim 15, wherein engaging the stacker block with the base block and preventing the stacker block from moving relative to the base block comprises inserting projections on the bottom side of the stacker block into openings in the top side of the base block.

* * * * *